(12) United States Patent
Colineau et al.

(10) Patent No.: US 10,190,690 B2
(45) Date of Patent: Jan. 29, 2019

(54) PRELIMINARY SEAL, PRELIMINARY SEAL ARRANGEMENT AND SEALING RING COMPRISING THE PRELIMINARY SEAL

(71) Applicant: Carl Freudenberg KG, Weinheim (DE)

(72) Inventors: Francois Colineau, Weinheim (DE); Guenter Hintenlang, Abtsteinach (DE); Thomas Klenk, Dossenheim (DE); Stefan Koenig, Lorsch (DE)

(73) Assignee: Carl Freudenberg KG, Weinheim (DE)

( * ) Notice: Subject to any disclaimer, the term of this patent is extended or adjusted under 35 U.S.C. 154(b) by 747 days.

(21) Appl. No.: 14/793,140

(22) Filed: Jul. 7, 2015

(65) Prior Publication Data

US 2016/0010750 A1 Jan. 14, 2016

(51) Int. Cl.
| | |
|---|---|
| *F16J 15/322* | (2016.01) |
| *F16J 15/3232* | (2016.01) |
| *F16J 15/3268* | (2016.01) |
| *F16J 15/3284* | (2016.01) |
| *F16J 15/3236* | (2016.01) |

(52) U.S. Cl.
CPC ......... *F16J 15/322* (2013.01); *F16J 15/3232* (2013.01); *F16J 15/3236* (2013.01); *F16J 15/3268* (2013.01); *F16J 15/3284* (2013.01)

(58) Field of Classification Search
CPC .... F16J 15/322; F16J 15/3232; F16J 15/3236; F16J 15/3268; F16J 15/3284
USPC ......................................................... 277/565
See application file for complete search history.

(56) References Cited

U.S. PATENT DOCUMENTS

| 4,801,270 | A | * | 1/1989 | Scarlata | H01R 4/64 |
| | | | | | 439/28 |
| 5,286,568 | A | * | 2/1994 | Bacino | C09D 127/12 |
| | | | | | 428/318.6 |
| 6,666,459 | B1 | * | 12/2003 | Hufnagel | F16J 15/3232 |
| | | | | | 277/572 |
| 2003/0031828 | A1 | * | 2/2003 | Kosty | F16J 15/3228 |
| | | | | | 428/122 |
| 2004/0232620 | A1 | * | 11/2004 | Bock | G01M 3/045 |
| | | | | | 277/320 |
| 2004/0245729 | A1 | * | 12/2004 | Bock | F16J 15/3284 |
| | | | | | 277/569 |
| 2006/0290070 | A1 | * | 12/2006 | Park | F16J 15/3244 |
| | | | | | 277/559 |

(Continued)

FOREIGN PATENT DOCUMENTS

| DE | 10314924 A1 | 11/2004 |
| DE | 10340802 A1 | 4/2005 |
| DE | 10 2013 000 982 A1 | 7/2014 |

(Continued)

OTHER PUBLICATIONS

German Office Action dated Dec. 2, 2014 (corresponding to DE 10 2014 010 269.6).

*Primary Examiner* — Nathan Cumar
(74) *Attorney, Agent, or Firm* — Daniel J. Sepanik, Esq.; Harness, Dickey & Pierce, P.L.C.

(57) ABSTRACT

Preliminary seal, comprising an essentially circular disc (1) of an electrically conductive material (2) permeable to air and a carrier body (3), wherein the disc (1) is configured as a separately produced individual part—in relation to the carrier body (3)—is joined to the carrier body (3).

22 Claims, 2 Drawing Sheets

(56) References Cited

U.S. PATENT DOCUMENTS

2010/0244387 A1*  9/2010  Warren ................ F16J 15/3208
                                                              277/559

FOREIGN PATENT DOCUMENTS

| JP | S47-5238 U    | 9/1972  |
| JP | S54-112440 A  | 9/1979  |
| JP | S60-167263 A  | 8/1985  |
| JP | 2004-232762 A | 8/2004  |
| JP | 2004-308906 A | 11/2004 |

* cited by examiner

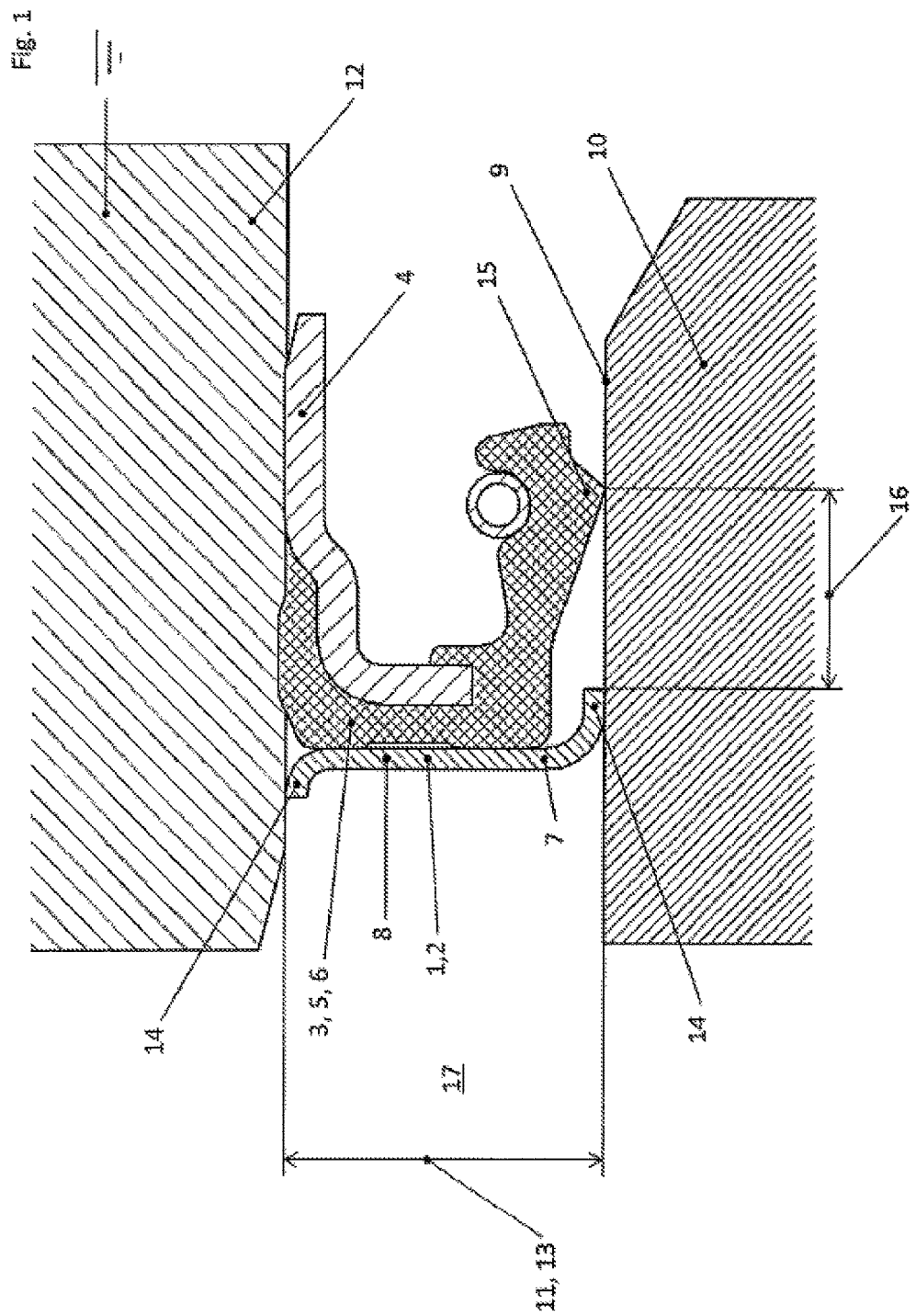

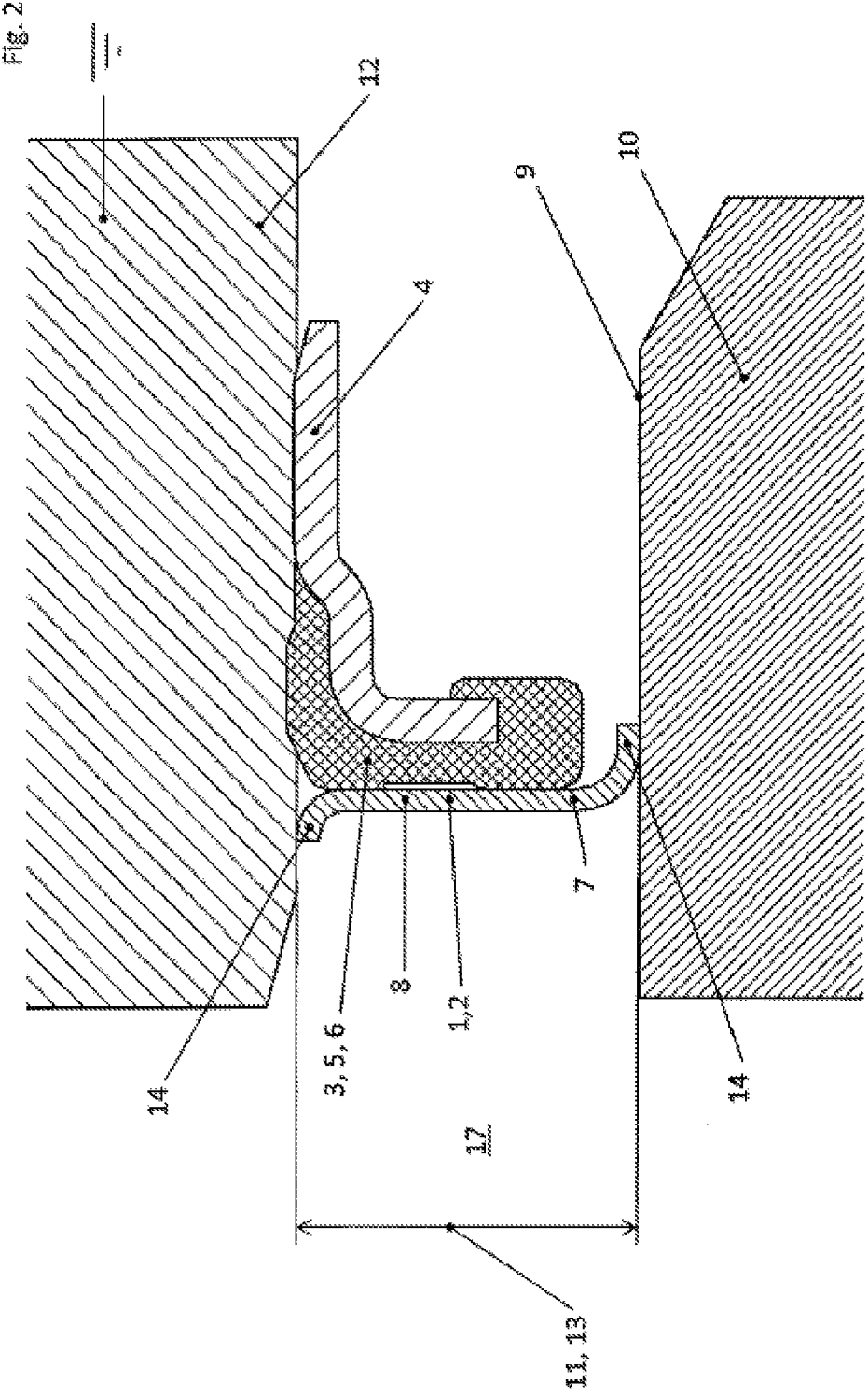

PRELIMINARY SEAL, PRELIMINARY SEAL ARRANGEMENT AND SEALING RING COMPRISING THE PRELIMINARY SEAL

CROSS-REFERENCE TO RELATED APPLICATIONS

This application claims the benefit and priority of German Application No. 10 2014 010 269.6, filed Jul. 11, 2014. The entire disclosure of the above application is incorporated herein by reference.

FIELD

The invention relates to a preliminary seal, a preliminary seal arrangement and a sealing ring, which comprises the preliminary seal.

BACKGROUND

A sealing ring, comprising at least one dynamically stressed lip seal and a preliminary seal, which is disposed at an axial spacing in an adjacent manner to the lip seal, wherein the preliminary seal is generally known, as is a seal arrangement, which comprises such a sealing ring. The sealing ring in this case may be configured as a radial shaft sealing ring, wherein the lip seal faces the medium to be sealed in an axial direction. In contrast, the preliminary seal faces the environment in an axial direction.

The preliminary seal is tasked with inhibiting contaminants from the environment from penetrating to the lip seal. This results in better functional properties of the lip seal over a longer operating life.

A sealing ring and a seal arrangement formed therewith are known from DE 103 40 802 A1. The sealing ring comprises a first component, which displays at least one lip seal, wherein this component of the sealing ring is composed of an electrically conductive material having rubber-elastic properties. The previously known sealing ring is used for sealing components, which include toothed parts, wherein charge separations occur during movement of these toothed parts. The resulting flows are thus in part diverted by a lubricant used, and in part the flows are conveyed further to the components to be sealed in relation to one another. As a result of the electrically conductive and rubber-elastic material, of which the first component of the sealing ring is composed, it is advantageous that flows may be simply diverted through the sealing ring. In one of the previously known exemplary embodiments, a dirt lip is associated with the dynamically stressed lip seal on the side facing axially away from the space to be sealed, which is formed integrally with, and of the same material as, the lip seal, and is thus also composed of an electrically conductive and rubber-elastic material. Polyamide is cited as an example of an electrically conductive material.

Another sealing ring is known from DE 103 14 924 A1, which is used in a seal arrangement for sealing a machine element, preferably a shaft. The sealing ring comprises a depot for absorbing leakage, wherein the depot is monitored by a measuring device. The measuring device is formed by a capacitor, and the depot functions as a dielectric. The depot is preferably configured as an absorbent or swellable, substantially annular disc which is composed of a porous material. The depot may be composed of a non-woven material, which changes its dielectric properties only by absorbing the leakage. The change in the measurable capacity of the depot associated therewith constitutes in this case the measure of the saturation of the depot by leakage. By measuring the capacity, it is possible to draw conclusions about the amount of leakage of the fluid in the depot.

SUMMARY

The object of the invention is to further develop a preliminary seal, a preliminary seal arrangement and a sealing ring which comprises the preliminary seal in such a way that an electrostatic charge and resulting damage to the machine elements to be sealed in relation to one another is prevented by the preliminary seal.

To achieve the object, a preliminary seal is provided, comprising a disc, which is configured so as to be substantially annular and is of an electrically conductive and air-permeable material, and a carrier body, wherein the disc—in relation to the carrier body—is configured as a separately produced individual part and is connected to the carrier body. With the preliminary seal, an electrically conductive connection and, therefore, an electrical potential equalization between machine elements to be sealed in relation one another is achieved. In this case, the machine elements to be sealed in relation to one another may be formed, for example, by a shaft and a housing, through which the shaft is guided. The preliminary seal causes a controlled electrical potential equalization between the machine elements.

As a result, mechanical damage to the machine elements by an electrostatic charge of one of the machine elements and a subsequent voltage puncture to the other machine element having a different electrical potential are precluded. In the preliminary seal arrangement, one of the machine elements is grounded to a defined ground potential (for example, the body of a motor vehicle as an electrical ground potential), so that a potential equalization with the other machine element is achieved as a result of the electrically conductive preliminary seal.

The preliminary seal is a decoupled electrical bridge. "Decoupled" is understood in this context to mean that the sealing function of, for example, a sealing ring combined with the preliminary seal is decoupled from the function of the electrical bridge, namely to avoid a voltage puncture and to effect an electrical potential equalization between machine elements. The preliminary seal is not in direct contact with the medium to be sealed. The advantage of this is that the electrical resistance of the preliminary seal is substantially constant during the entire service life of the preliminary seal. If the preliminary seal were to come into contact with the medium to be sealed, the resistance would then change uncontrollably.

The material of which the disc is composed is not only electrically conductive, but is also air-permeable. The air permeability is achieved as a result of an open porosity of the material, of which the disc is composed. As a result, the preliminary seal displays only a very minimal radial force, with which it touches in a closely fitting manner the machine elements to be sealed in relation to one another. As a result of the air permeability of the material, it is possible for a pressure equalization to occur axially on both sides of the preliminary seal, such that the preliminary seal may easily be used in combination with a sealing ring, even when a relative excessive pressure or a relative negative pressure forms on an axial side of the preliminary seal during proper use. The preliminary seal, because of its air permeability, effects a pressure equalization axially on both sides. Moreover, it is advantageous that due to the minimal friction force, the friction moment and, therefore, the wear of the preliminary seal are only negligibly. In such case, the air permeability of the material should correspond to or exceed at least the air-conveying capability of the radial shaft sealing ring. For example, a radial shaft sealing ring of FKM material for a shaft having an 85 mm diameter conveys at 40° C. and at 4000 rpms approximately 10 ml of air per second.

According to one advantageous embodiment, it may be provided that the disc displays an electrical resistance, which is ≤100Ω, more preferably ≤10Ω.

To adjust such a resistance intended to remain constant over the entire service life, the decoupling of the preliminary seal from the seal of the medium to be sealed, as explained previously, is of crucial importance.

The previously cited resistances may be achieved with the materials and configurations of the disc explained below. If, for example, a sealing ring, specifically a radial shaft sealing ring, is used together with the preliminary seal, the disc and the lip seal of the radial shaft sealing ring display materials differing from one another. The preliminary seal in this case is primarily an electrical conductor, secondarily a preliminary seal.

The advantage of the scale of the previously cited resistances is that they cover the range less equal 100 ohm. For other specific uses, however, they may also be set in the range less equal 10 ohm.

The carrier body may, for example, be formed by a support ring, which is composed of a hard and tough material. The support ring may, for example, be composed of a metallic or a polymer material. In such case, the disc is indirectly or directly connected to the support ring, wherein such a preliminary seal may be combined with sealing rings in a modular configuration. The disc is held in its mounting space by the support ring.

According to another embodiment, it is possible for the carrier body to be formed by a sealing ring. In such a case, the disc and the sealing ring may form a preassembled unit. The sealing ring may, for example, be configured as a radial shaft sealing ring.

One option for connecting the disc and the carrier body consists of adhesively bonding the two aforementioned parts to one another. An adhesive bonding is easy and cost-effective to implement.

The material, of which the disc is composed, may be formed by a non-woven material. Non-woven materials fulfill the aforementioned requirements especially well; they may be produced/fitted and designed to be sufficiently air-permeable and sufficiently electrically conductive.

For an electrical potential equalization between machine elements, i.e., to prevent an electrostatic charge with subsequent voltage puncture, non-woven materials having fibers displaying a fiber length of 2 mm to 200 mm have proven especially reliable. Such a material has excellent electrical conductivity.

According to another advantageous embodiment, it may be provided that the non-woven material displays a mass per unit area of 20 g/m$^2$ to 200 g/m$^2$. Such non-woven materials have an advantageously small radial pressing force, good electrical conductivity and are sufficiently air-permeable. The low radial pressing force minimizes the formation of frictional heat, even at speeds of up to 25,000 min$^{-1}$. The operation-related wear of non-woven materials having the aforementioned fiber length and the aforementioned mass per unit area is particularly minimal.

A particular advantage of discs composed of a non-woven material, as opposed, for example, to known brush rotors, lies in this case in the quasi-isotropic fiber orientation in non-woven materials as opposed to brushes. As a result, the fibers in the non-woven materials, unlike brushes, contact the machine elements to be sealed at various contact angles. In brushes, the end of the fibers are oriented usually perpendicular only to the surface of the machine element to be sealed, comparable to a pin on a disc. Conversely, the fibers of non-woven materials also include tangential radial segments which lie flush, splayed so to speak, against the shaft over a wide area, such that the disc composed of non-woven material—has very low contact resistances—despite the low radial pressing forces. This contact over a wide area permits a particularly effective potential equalization between the machine elements, between which the preliminary seal is disposed.

According to another embodiment, the material, of which the disc is composed, may be formed by a fabric. The advantage of a fabric over a non-woven material is that, unlike the non-woven material, the fiber length of the fabric may be still further increased. In this case, however, a quasi-isotropic orientation is possible only when using multilayer laminates, which has economic disadvantages.

The material may include electrically conductive particles. These particles may, for example, be formed by carbon fibers or by metallic particles, in particular by metal wires.

The advantage of using particles made of carbon fibers is that in this case the excellent electrical conductivity is linked to the superior elasticity, which the non-woven disc, in the manner of a multilayered spring, continually applies to the shaft with the lowest radial forces possible.

In contrast, metal wires are used as electrically conductive particles, for example, when strongly oxidizing environmental conditions are expected. In this case, however, the resiliency is reduced somewhat, and potential adhesive or abrasive wear is disadvantageous.

Further improved functional properties of the preliminary seal occur when the disc also displays an impregnation of a PTFE dispersion. This is surprising, since PTFE is known to be a poor electrical conductor and, in spite of that, the conductivity of the non-woven material is improved as a result of the impregnation.

The improvement of the electrical conductivity as a result of the PTFE dispersion is presumably due to the fact that, during impregnation, the dispersion is lodged in the interstitial spaces of the non-woven material and, after drying, the electrically conductive fibers of the non-woven material remain more durably bonded.

In the ready-to-use condition, the disc may display a calendared thickness, which amounts to 255 to 95% of the production-related initial thickness.

When calendaring, it should be noted that the non-woven material is not excessively solidified; the air permeability must be retained for the functional properties described above. If, after being impregnated with the PTFE dispersion, the non-woven material undergoes a calendaring process, the contact with the fibers in the non-woven material is further reinforced and permanently sealed. As a result of calendaring, the wear resistance of the non-woven material is improved, so that the disc and, therefore, the entire preliminary seal, display consistently good functional properties during a long service life.

Alternatively, a wax dispersion may be used as another type of bonding and, optionally, fillers for additional functionalities may be introduced, for example, by means of impregnation, into the disc.

The preliminary seal arrangement includes a preliminary seal, as described above, wherein the disc of the preliminary seal touches in a sealing and closely fitting manner a surface to be sealed of a first machine element to be sealed, wherein the first machine element to be sealed is disposed at a radial spacing so as to be adjacent to a second machine element, wherein the disc is disposed in the gap formed by the radial spacing, wherein the second machine element is grounded to a defined ground potential, wherein the second machine element is touched by the disc in a closely fitting manner and wherein, on account thereof, the first machine element and the second machine element are interconnected in an electrically conductive manner. As a result of such an electrically conductive connection of the two machine elements through the electrically conductive disc, an electrical potential equalization is created between the two machine elements, and mechanical damage to the machine elements as a result of a voltage puncture is precluded.

In the preliminary seal arrangement, one of the machine elements is grounded, so that as a result of the potential equalization, the other machine element is also grounded. As a result of the electrical potential equalization and the grounding of the preliminary seal arrangement, mechanical damage to the machine elements caused by voltage punctures is avoided.

Without the electrical potential equalization, mechanical damage to the machine elements to be sealed in relation to one another caused by voltage punctures could occur as a result of variously high electrical potentials of the machine elements being equalized by an electrical voltage puncture. Such a voltage puncture is all the more likely, the closer the machine elements having different electrical potentials are disposed to one another. Such a voltage puncture may cause a removal of material on the machine element having a relatively low charge, and a change in the material structure in the area in which the voltage puncture occurs.

In the production-related state, the disc may display an overlap with the machine elements to be electrically connected to one another and to be sealed off from one another, amounting to 0.5 mm to 5 mm. Such an overlap is advantageously tried and tested with respect to a good electrical conductivity. An undesirably high pressing force and, resulting therefrom, an undesirably high frictional heat and high wear are minimized as a result.

The first machine element may be formed by a drive shaft of an electric motor, the second machine element may be formed by a housing of a transmission connected to the electric motor and enclosing the drive shaft. This specific use of the preliminary seal arrangement is particularly advantageous. When the electric motor and the transmission together form a drive unit, this normally results in a static charge of individual components of the drive unit due to the operation of the electric motor and, therefore, in potential differences between components, which are not statically charged.

In general, there is the possibility of inducing a potential equalization between components having different potentials using comparatively costly constructive measures. In the preliminary seal arrangement according to the invention, this potential equalization is achieved by the preliminary seal according to the invention, which is simple in design and is simple and cost-effective to produce. During proper use of an electric motor, the drive shaft thereof may be electrostatically charged. The drive shaft of the electric motor extends into a transmission adjoining the electric motor. Without a potential equalization, there would be the danger of a voltage puncture occurring between the electrostatically charged drive shaft, and components of the transmission and machine elements of the transmission being mechanically damaged as a result of a voltage puncture. To prevent this, it is provided according to the invention that the potential equalization is achieved as a result of the preliminary seal according to the invention. The electrostatic charge of the drive shaft is discharged with the aid of the disc, which is composed of an electrically conductive and air-permeable material, for example, of a non-woven material or a fabric, onto the adjacent machine element, which is grounded to a defined ground potential. Thus, the drive shaft is also grounded. Because there is no potential difference between the drive shaft and the adjacent components of the transmission, a voltage puncture also cannot occur, which could result in mechanical damage.

In addition, the invention relates to a sealing ring, comprising at least one dynamically stressed lip seal and a preliminary seal, which is disposed at an axial spacing in an adjacent manner to the lip seal. The lip seal may be composed of an elastomeric material.

The sealing ring may comprise at least one dynamically stressed lip seal and at least one statically stressed seal. The dynamically stressed lip seal may, for example, enclose a shaft to be sealed, and the seal may touch the bore of a housing in a sealing manner.

To achieve the object, it is provided that the preliminary seal of the sealing ring is composed of an electrically conductive and air-permeable non-woven material.

It is advantageous in this case that the preliminary seal of the sealing ring establishes an electrically conductive connection between the machine elements to be sealed in relation to one another, and thereby causes an electrical potential equalization between the machine elements. As a result, mechanical damage to the machine element resulting from an electrical voltage puncture is precluded. In addition to the electrical potential equalization, the preliminary seal protects the lip seal from being impacted by contaminants from the environment.

The air permeability of the preliminary seal prevents the occurrence of disadvantageous pressure differences axially on both sides of the disc, for example, even when the temperatures in the environment and in the space to be sealed change relative to one another.

The lip seal may be composed of an elastomeric material. Elastomeric materials as sealing materials for lip seals are generally known, wherein a wide variety of materials are available for a wide variety of uses. For many applications, elastomeric materials are available at favorable costs and are easy to process.

A dirt lip may be disposed between the lip seal and the disc of the preliminary seal. Such a dirt lip forms additional protection against the intrusion of contaminants from the environment in the direction of the lip seal. Contaminants, which have passed the disc of the preliminary seal in the direction of the lip seal, are then retained by the dirt lip. The preliminary seal and the dirt lip are arranged in a functional series connection. According to one advantageous embodiment, it may be provided that the dirt lip and the lip seal are integrally formed merging into one another and of the same material. The production of the sealing ring is simplified as a result. Depending on the respective circumstances of the application, however, it may also be possible for the dirt lip and the lip seal to be composed of sealing materials differing from one another. In this way, each of the lips may be adapted, individualized functionally to the respective tasks.

DRAWINGS

Two exemplary embodiments of the claimed preliminary seal arrangement having the claimed preliminary seal are schematically depicted in FIGS. 1 and 2 and are described in greater detail below, in which:

FIG. 1 shows a first exemplary embodiment, in which the carrier body of the preliminary seal is formed by a radial shaft sealing ring, wherein the disc is connected to the radial shaft sealing ring, FIG. 2 shows a second exemplary embodiment, in which the carrier body is formed by a support ring, wherein the support ring and the disc are disposed on the side of a radial shaft sealing ring facing axially away from the space to be sealed.

DETAILED DESCRIPTION

FIGS. 1 and 2 each show a preliminary seal arrangement according to the invention, which comprises a preliminary seal according to the invention. The preliminary seal is disposed within the gap 13 between the first machine element 10 and the second machine element 12, wherein the gap is formed by a radial spacing 11.

The first machine element 10 is formed by the shaft of a power unit, the second machine element 12 is formed by the housing of this power unit. The power unit may, for example, be an electric motor or else a transmission. The shaft may be a motor shaft or a drive shaft.

The preliminary seal comprises the disc 1, which is configured so as to be substantially annular and is of an electrically conductive and air-permeable material 2. In the exemplary embodiments shown herein, this material 2 is composed of a non-woven material, which displays fibers having a fiber length of 2 mm to 200 mm. The mass per unit area of the non-woven material is 20 g/m$^2$ to 200 g/m$^2$, and electrically conductive particles 7 are disposed in the non-woven material, which are formed in the exemplary embodiment shown by carbon fibers. In addition, each of the discs 1 in the exemplary embodiments shown is provided with an impregnation 8 of a PTFE dispersion, wherein the thickness of the ready-to-use discs 1 shown here is approximately 50% of the production-related initial thickness of the discs 1. The electrical resistance of the discs 1 is ≤10Ω.

The disc 1 of the preliminary seal touches in a close fitting manner the surface 9 of the first machine element 10 to be sealed. The second machine element 12 is grounded to a defined ground potential, wherein the second machine element 12 is also touch by the disc 1 in a close fitting manner. Thus, the first machine element 10 and the second machine element 12 are interconnected in an electrically conductive manner by the disc 1. In the production-related state, the disc 1 has an overlap 14 with the machine elements (10, 12) which are to be electrically interconnected and to be sealed in relation to one another, which is overall approximately 2.5 mm. As a result of the overlap 14, the radially inner and radially outer edge of the disc 1 each bulge outwardly in the axial direction during proper use. Due to the electrically conductive interconnection between the first machine element 10 and the second machine element 12 as a result of the disc 1, an electrical potential equalization occurs between the two machine elements 10, 12. In addition to this electrical potential equalization, the preliminary seal also ensures that contaminants from the environment 17 are prevented from axially penetrating to the lip seal 15.

In FIG. 1, the carrier body 3 of the preliminary seal is formed by a sealing ring 5, which in this case is configured as a radial shaft sealing ring 6. The disc 1 and the radial shaft sealing ring 6 are connected to one another on their sides axially facing one another. In this way, the preliminary seal and the radial shaft sealing ring 6 form a pre-assembled unit.

In contrast, the carrier body 3 in FIG. 2 is formed by a support ring 4, to which the disc 1 is also attached. A preliminary seal configured in this way may be combined in the manner of a module with variously designed sealing rings or may also be operated alone, apart from a sealing ring.

Disposed between the lip seal 15, which, in the exemplary embodiments shown, is composed of an elastomeric material, and the disc 1, is an axial spacing 16.

LIST OF REFERENCE NUMERALS

1 Disc
2 Material
3 Carrier body
4 Support ring
5 Sealing ring
6 Radial shaft sealing ring
7 Conductive particle
8 Impregnation
9 Surface of 10 to be sealed
10 First machine element
11 Radial distance between 10 and 12
12 Second machine element
13 Slot according to 11
14 Overlap
15 Lip seal
16 Axial distance between preliminary seal and lip seal 15
17 Environment

The invention claimed is:

1. A preliminary seal arrangement, comprising, a housing defining a shaft hole; a shaft received in the shaft hole; and a disc (1), which is configured so as to be substantially annular and is of an electrically conductive and air-permeable material (2), and a carrier body (3), wherein the disc (1)—in relation to the carrier body (3)—is configured as a separately produced individual part and is connected to the carrier body (3), wherein the disc (1) contacts both the housing and the shaft, wherein the carrier body is a radial shaft sealing ring (5) and the disc (1) displays an air permeability which corresponds to at least an air-conveying capability of the radial shaft sealing ring.

2. The preliminary seal according to claim 1, wherein the disc (1) displays an electrical resistance which is ≤100 Ω.

3. The preliminary seal according to claim 1, wherein the disc (1) displays an electrical resistance which is ≤10 Ω.

4. The preliminary seal according to claim 1, wherein the carrier body (3) is formed by a support ring (4) which is composed of a hard and tough material.

5. The preliminary seal according to claim 1, wherein the carrier body (3) is formed by a sealing ring (5).

6. The preliminary seal according to claim 5, wherein the sealing ring (5) is configured as a radial shaft sealing ring (6).

7. The preliminary seal according to claim 1, wherein the disc (1) and the carrier body (3) are adhesively bonded to one another.

8. The preliminary seal according to claim 1, wherein the material (2) of which the disc (1) is composed is formed by a non-woven material.

9. The preliminary seal according to claim 8, wherein the non-woven material displays fibers having a fiber length of 2 mm to 200 mm.

10. The preliminary seal according to claim 8, wherein the non-woven material displays a mass per unit area of 20 g/m$^2$ to 200 g/m$^2$.

11. The preliminary seal according to claim 1, wherein the material (2) of which the disc (1) is composed is formed by a woven fabric.

12. The preliminary seal according to claim 1, wherein the material (2) comprises electrically conductive particles (7).

13. The preliminary seal according to claim 12, wherein the particles (7) are formed by carbon fibers.

14. The preliminary seal according to claim 12, wherein the particles (7) are configured so as to be metallic.

15. The preliminary seal according to claim 14, wherein the particles (7) are formed by metal wires.

16. The preliminary seal according to claim 1, wherein the disc (1) displays an impregnation (8) of a PTFE dispersion.

17. The preliminary seal according to claim 1, wherein the disc (1) displays a thickness by calendering which is 25% to 95% of the manufacturing-dependent initial thickness.

18. A preliminary-seal arrangement, comprising: a preliminary seal including a disc (1), which is configured so as to be substantially annular and is of an electrically conductive and air-permeable material (2), and a carrier body (3), wherein the disc (1) of the preliminary seal touches in a sealing and closely fitting manner a surface (9) to be sealed of a first machine element (10) to be sealed, wherein the first machine element (10) to be sealed is disposed at a radial spacing (11) so as to be adjacent to a second machine element (12), wherein the disc (1) is disposed in a gap (13) formed by the radial spacing (11), wherein the second machine element (12) is grounded to a defined ground potential, wherein the first machine element and the second machine element (12) are touched by the disc (1) in a closely fitting manner and wherein, on account thereof, the first machine element (10) and the second machine element (12) are interconnected in an electrically conducting manner,
wherein the carrier body is a radial shaft sealing ring (5) and the disc (1) displays an air permeability which corresponds to at least an air-conveying capability of the radial shaft sealing ring.

19. The preliminary-seal arrangement according to claim 18, wherein the disc (1) in the manufacturing-dependent state displays an overlap (14) of 0.5 mm to 5 mm with the machine elements (10, 12) which are to be electrically interconnected and to be sealed in relation to one another.

20. The preliminary-seal arrangement according to claim 18, wherein the first machine element (10) is formed by a drive shaft of an electric motor, and the second machine element (12) is formed by a housing.

21. A sealing ring arrangement, comprising—a housing defining a shaft hole; a shaft received in the shaft hole; and at least one dynamically stressed lip seal (15) and a preliminary seal including a disc (1), which is configured so as to be substantially annular and is of an electrically conductive and air-permeable material (2), and a carrier body (3), wherein the preliminary seal is disposed at an axial spacing (16) in an adjacent manner to the lip seal (15), wherein the disc (1) contacts both the housing and the shaft,
wherein the carrier body is a radial shaft sealing ring (5) and the disc (1) displays an air permeability which corresponds to at least an air-conveying capability of the radial shaft sealing ring.

22. The sealing ring according to claim 21, wherein the lip seal (15) is composed of an elastomeric material.

* * * * *

UNITED STATES PATENT AND TRADEMARK OFFICE
CERTIFICATE OF CORRECTION

PATENT NO. : 10,190,690 B2
APPLICATION NO. : 14/793140
DATED : January 29, 2019
INVENTOR(S) : Francois Colineau et al.

Page 1 of 1

It is certified that error appears in the above-identified patent and that said Letters Patent is hereby corrected as shown below:

On the Title Page

Item (65) Prior Publication Data, Line number 1, after "Jan. 14, 2016" insert
--¶(30) Foreign Application Priority Data Jul. 11, 2014 (DE) 10 2014 010 269.6--.

Column 2, item (57) Abstract, Line number 5, before "is" insert --and--.

Signed and Sealed this
Sixteenth Day of April, 2019

Andrei Iancu
*Director of the United States Patent and Trademark Office*